Dec. 20, 1938.   M. FRISCH   2,140,991
FUEL COMBUSTION SYSTEM
Filed Dec. 29, 1933   4 Sheets-Sheet 1

INVENTOR
MARTIN FRISCH
BY
ATTORNEY

Dec. 20, 1938.  M. FRISCH  2,140,991
FUEL COMBUSTION SYSTEM
Filed Dec. 29, 1933  4 Sheets-Sheet 2

INVENTOR
MARTIN FRISCH
BY
ATTORNEY

Dec. 20, 1938. M. FRISCH 2,140,991
FUEL COMBUSTION SYSTEM
Filed Dec. 29, 1933 4 Sheets-Sheet 4

INVENTOR
MARTIN FRISCH
BY
ATTORNEY

Patented Dec. 20, 1938

2,140,991

UNITED STATES PATENT OFFICE 2,140,991

FUEL COMBUSTION SYSTEM

Martin Frisch, New York, N. Y., assignor to Foster Wheeler Corporation, New York, N. Y., a corporation of New York Application December 29, 1933, Serial No. 704,452

25 Claims. (Cl. 110—106)

This invention relates to pulverizing systems and more particularly pertains to systems for pulverizing fuel, such as coal, and feeding the fuel to a furnace or other place where combustion of the fuel will occur.

In systems of this character, the fuel after pulverization, is ordinarily carried by a current of air moving through a conduit directly to a furnace where combustion takes place, rather than to a storage bin. The pulverized fuel and air mixture is combustible and under certain conditions explosive and in the event the velocity of the air and fuel mixture moving from the pulverizing means to the furnace is materially reduced below a normally safe velocity for any reason, such as the stopping or breakage of the exhauster fan or the plugging of the burners or the fuel conduit, combustion and under certain conditions, an explosion in the conduit or pulverizing means or both is likely to occur due to the propagation of flames from the furnace to the pulverizer.

The present invention provides novel means for avoiding the propagation of flames to a pulverizer from a furnace or burner served by it. In general, such means comprises one or more devices which respond to the pressure conditions existing in the system and which serve to operate, when the pressure conditions in the system approach or reach the point where an explosion is likely to occur, means for closing the conduit connecting the pulverizer and furnace and for scavenging with clear air the exhauster and the conduit between the conduit closing means and the furnace, thus substituting a non-combustible atmosphere incapable of propagating flame for the combustible fuel mixture in said conduit and exhauster by the operation of the pressure responsive devices.

The nature of the invention will be clearly understood from the following description considered in connection with the accompanying drawings forming a part thereof and in which.

Like characters of reference refer to like parts throughout the several views.

Figure 1:
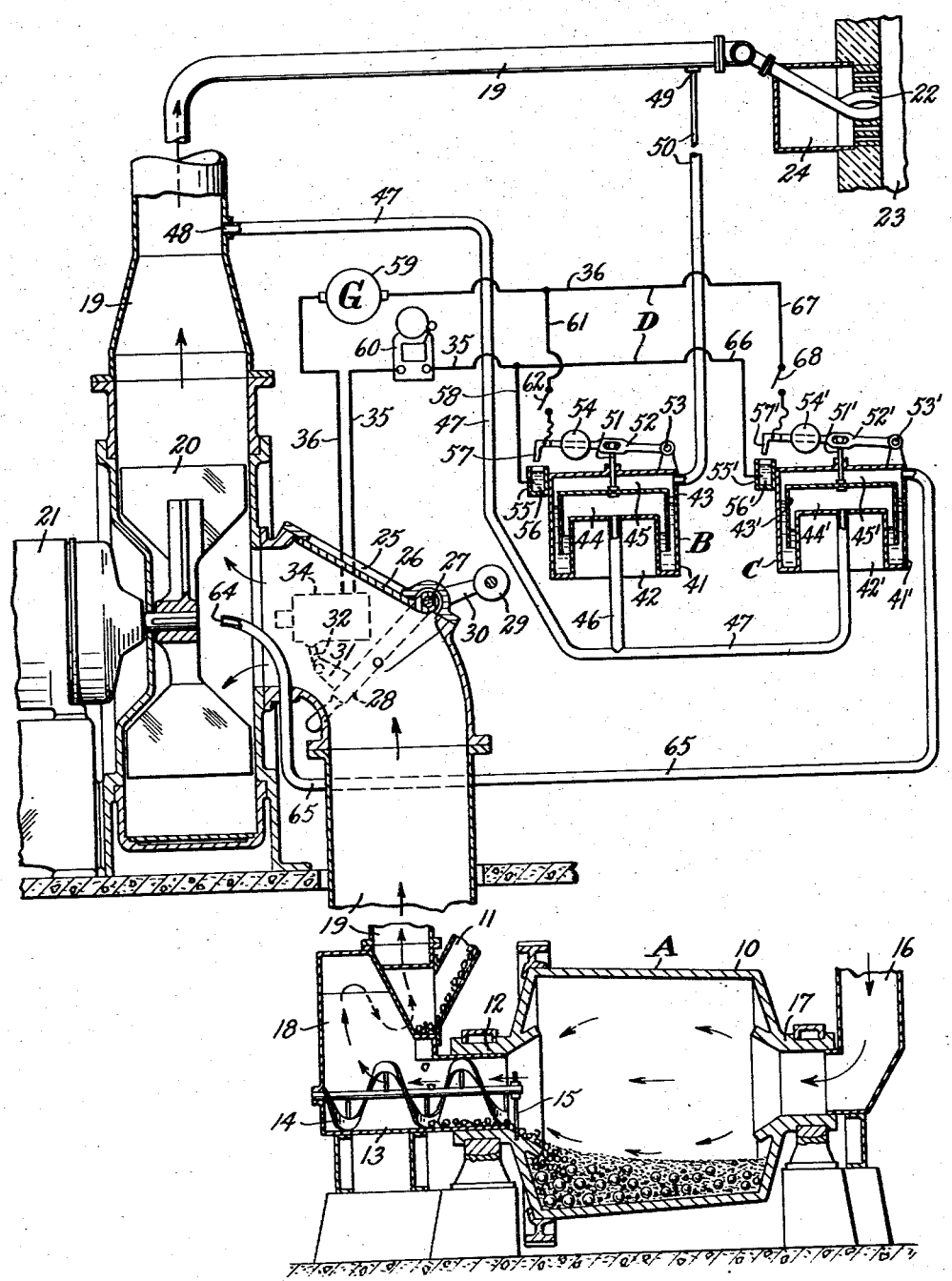
Fig. 1 is a more or less diagrammatic view in elevational section of pulverizing and feeding equipment embodying one form of the present invention.

Referring to the drawings, particularly Fig. 1, reference letter A indicates generally a ball mill pulverizer comprising a cylindrical shell 10 rotatable about a horizontal axis and which contains the material to be pulverized and grinding or pulverizing balls of various desired sizes. The material to be pulverized is introduced into the mill through a feed conduit 11 and through trunnion 12. The material from the feed conduit 11 drops into a conveyor passage 13 and is introduced into the shell 10 by means of a helical conveyor 14 connected to the shell 10 by connection 15 for rotation by the shell. Air in sufficient quantity and at the proper temperature is introduced into the shell through an air duct 16 and trunnion 17. The pulverized material is picked up by the air current flowing through the mill and is carried through trunnion 12 into a classifier 18 where the desired classification of the fine and coarser particles of the material takes place. The coarser particles are separated from the finer particles and the former drop down into the conveyor passage 13 and are returned to the mill through trunnion 12 by the conveyor 14. The material which has been pulverized to the desired extent is carried by the air current through the feed conduit 19 to the point of use. It will be understood that the particular type of pulverizing equipment or apparatus disclosed herein is not essential to the carrying out of the invention. Other forms or types of pulverizing apparatus may be employed, if desired.

The invention as disclosed is applied particularly to the pulverization of coal and the feeding thereof to one or more burners in a furnace for firing a boiler or still or the like. The pulverized coal is drawn from the mill through the classifier 18 and the feed conduit 19 by an exhauster fan 20 of any suitable type or kind. Fan 20 is mounted in the feed conduit 19 and is driven or rotated by any suitable means such as the electric motor 21 indicated. Fan 20 draws the air and the pulverized coal carried thereby from the mill and forces it through the feed conduit 19 into one or more burners 22 in a furnace 23. Air is supplied to the burners 22 through an air conduit 24.

As shown, on the suction side of the exhauster fan 20, feed conduit 19 is provided with an air opening 25 which is adapted to be closed by a damper 26 secured as shown, at one end thereof to an oscillatable shaft 27 so as to provide for the movement of the damper into a position to entirely or to substantially entirely close the feed conduit 19 and to open the conduit to the atmosphere or other source of clear air, so that fresh air may be drawn in through the opening 25 by the fan and forced into the burners 22 and furnace 23. Damper 26 is provided with an operating lever 28 which is secured at one end to the shaft 27 and which is disposed outside of the feed conduit. A counter-weight 29 is mounted on the end of a counter-weight arm 30 secured to the shaft 27 to counterbalance the damper 26. The damper 26 during operation of the pulverizing system is normally in the position shown in Fig. 1, that is to say, so that the feed conduit 19 is entirely open and the opening 25 is completely closed. However, it will be understood that the damper 26 may be utilized as a capacity controlling device by causing it to assume any position intermediate its fully open position with respect to the interior of conduit 19 as shown in Fig. 1, and its fully closed position wherein it entirely cuts off the feed conduit 19.

Figure 2:
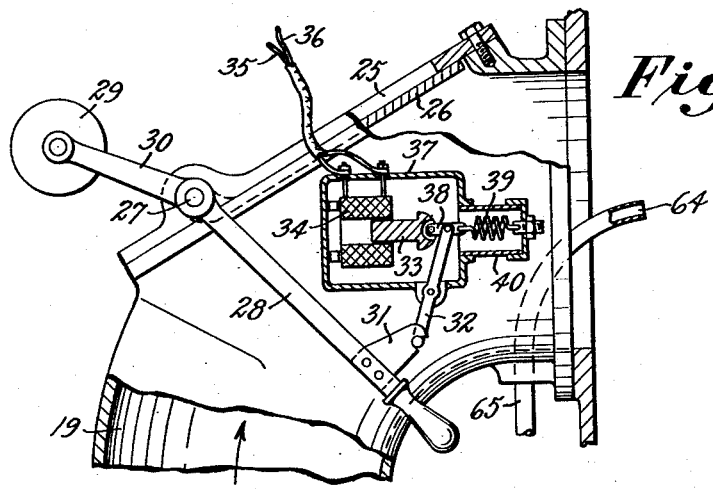
Fig. 2 is an enlarged view, partly in section, of part of the equipment shown in Fig. 1.

The damper 26 is normally held in its open position, that is, in a position such that the conduit 19 is open as shown in Figs. 1 and 2, by means of an arm 31 secured to the lever 28 which is engaged by one end of a solenoid lever 32 pivoted intermediate its ends, the other end of lever 32 being pivoted through a link 38 to the core 33 of a solenoid 34. Current for operating the solenoid is supplied thereto through leads 35 and 36. The solenoid is mounted in a casing 37 and the core 33 is connected through link 38 to one end of a tension spring 39, the other end of which is secured to the outer end of a cover extension 40. As shown in Figs. 1 and 2, the solenoid 34 is normally deenergized and spring 39 maintains core 33 in its outer position so that the lever 32 normally engages arm 31 to hold the damper in its open position, or in a position so that conduit 19 is open.

Means responsive to the pressure conditions existing in the pulverizing system, or more specifically pressure conditions existing in the feed conduit 19, are utilized for operating the solenoid 34 at such times as it becomes necessary to cut off the mill from the fan and furnace to prevent the propagation of flames back from the furnace to the mill with resultant danger of an explosion in the mill. As shown in Fig. 1, such means consists of a pressure responsive device indicated generally B which is responsive to pressure conditions existing at spaced points between the fan and furnace, and a pressure responsive device indicated generally C which is responsive to the pressures developed by the exhauster 20 on its suction and pressure sides. Pressure responsive device B as shown, consists of a cylindrical casing 41 having a centrally disposed cylindrical recess 42 in its lower portion. The casing 41 is partly filled with a liquid such as mercury, which serves to support a bell float 43 in the casing. Bell float 43 divides casing 41 into a lower chamber 44 and an upper chamber 45. The lower chamber 44 is connected by a tube 46 to a tube 47 which communicates with the feed conduit 19 at a point 48 adjacent the pressure side of exhauster fan 20. The upper chamber 45 is connected to the feed conduit 19 at a point 49 adjacent the furnace 23 by a tube 50. Bell float 43 is connected by a rod 51 secured thereto, to the intermediate portion of a lever 52 pivoted at one end 53 to the casing 41 and a weight 54 is adjustably mounted on the lever adjacent the other end so as to urge the bell float downwardly as seen in Fig. 1. A contact cup 55 filled with a suitable electrical conducting liquid 56, such as mercury, is secured to the upper portion of the casing 41 in a position so that when lever 52 moves downwardly, the end 57 of the lever will come into contact with the fluid 56. Fluid 56 is connected by a lead 58 to lead 35 of an electrical circuit designated generally D, and which includes a source of current, such as a generator 59, and if desired, a signal 60. End 57 of lever 52 is connected by a lead 61 through a switch 62, if desired, to lead 36 of the circuit D. The pressure responsive device C is similar in all respects to the pressure responsive device B so that it is unnecessary to describe device C in detail. The parts thereof are designated by the same reference characters which designate the parts of the pressure responsive device B but with the addition of a prime to each character. Chamber 45' of the device C is connected to point 48 in the feed conduit 19 by pipe 47. Chamber 44' of device C is in communication with a point 64 adjacent the suction side of the exhauster fan 29 through a tube 65. Fluid 56' in cup 55' is electrically connected to lead 35 of circuit D by lead 66 and end 57' of lever 52' is electrically connected to lead 36 of circuit D by means of a lead 67 through a switch 68. It will be understood that any suitable form of pressure responsive devices may be utilized in lieu of the floating bell devices shown in Fig. 1. Such other devices may be of the diaphragm, sylphon, piston or other suitable type.

The operation is as follows: Upon the occurrence of an accident such as the plugging up of the burners 22 or of the feed conduit 19 or of the mill or of any accident causing a reduction in the flow of air and fuel through the conduit 19 to a dangerous degree, the difference in pressure between points 48 and 49 in conduit 19 will be varied so that a greater pressure than normal will exist at point 49 or a lesser pressure than normal will exist at point 48, as a result of which bell float 43 will be moved downwardly as seen in Fig. 1 under the action of weight 54 and end 57 of lever 52 will enter liquid 56 and will close circuit D provided switch 62 is closed, thus energizing solenoid 34 which will attract its core 33 and cause it to move inwardly of the coil or to the left as shown in Fig. 2, thereby rocking solenoid lever 32 in a counterclockwise direction as seen in Fig. 2 against the action of spring 39 and release the arm 31 on damper lever 28 and permit the damper 26 because of the weight of lever arm 28 to move downwardly into its closed position in which position the damper will cut off the mill from the furnace and open conduit 19 to the atmosphere or other source of clear air thereby preventing the propagation of flames from the furnace to the mill and a possible explosion in the latter. Upon the occurrence of an accident such as the stalling or stopping of the means for propelling the exhauster fan, or the stripping of the blades from the exhauster fan without stopping the fan, or of a plugging up of the exhauster fan, the pressure responsive device C will be actuated as a result either of an increase in pressure at point 64 or a decrease in pressure at point 48 in conduit 19, or both. Such variations in pressure will cause bell float 43' to move downwardly, as shown in Fig. 1, which will close circuit D through liquid 56' and lever end 57', provided switch 68 is closed, as a result of which the solenoid 34 will be energized as previously described and will release the damper and permit it to move to closed position. Accordingly, it will be seen that when the pressure conditions in the system fall below predetermined critical values or when the differences in pressures at different points in the system fall below predetermined critical values, the mill will be entirely cut off from the furnace and clear air will be drawn into the conduit connecting the mill and furnace so as to avoid any danger of explosion taking place in the mill or conduit. It will be understood that when the damper is moved to closed position as a result of any condition which will tend to stop the exhauster fan, the momentum of the fan will cause it to run sufficiently long after the damper has moved to closed position, so that the conduit 19 becomes scavenged and a non-combustible atmospheric barrier to flame propagation is introduced between the damper and the furnace in addition to the barrier of the damper itself.

To reset the damper and the control mechanism, it is merely necessary to open switch 62 or switch 68 or both, depending upon whether device B or C or both had been actuated, to thereby deenergize solenoid 34 and permit spring 39 to move core 33 to its outermost position and to move lever 32 back to its normal position wherein it will engage arm 31 of the damper lever 28 to hold the damper in open position. The damper is returned manually to its normally open position as shown in Fig. 1. After the system resumes its normal operation, and the pressure conditions in the system return to normal, the bell floats 43 and 43' will also return to their normal position and the circuit D will be broken at the liquids 56 and 56' and the switches 62 and 68 may then be closed. The control system is then in condition to again operate to cut off the damper when necessary.

Figure 3:
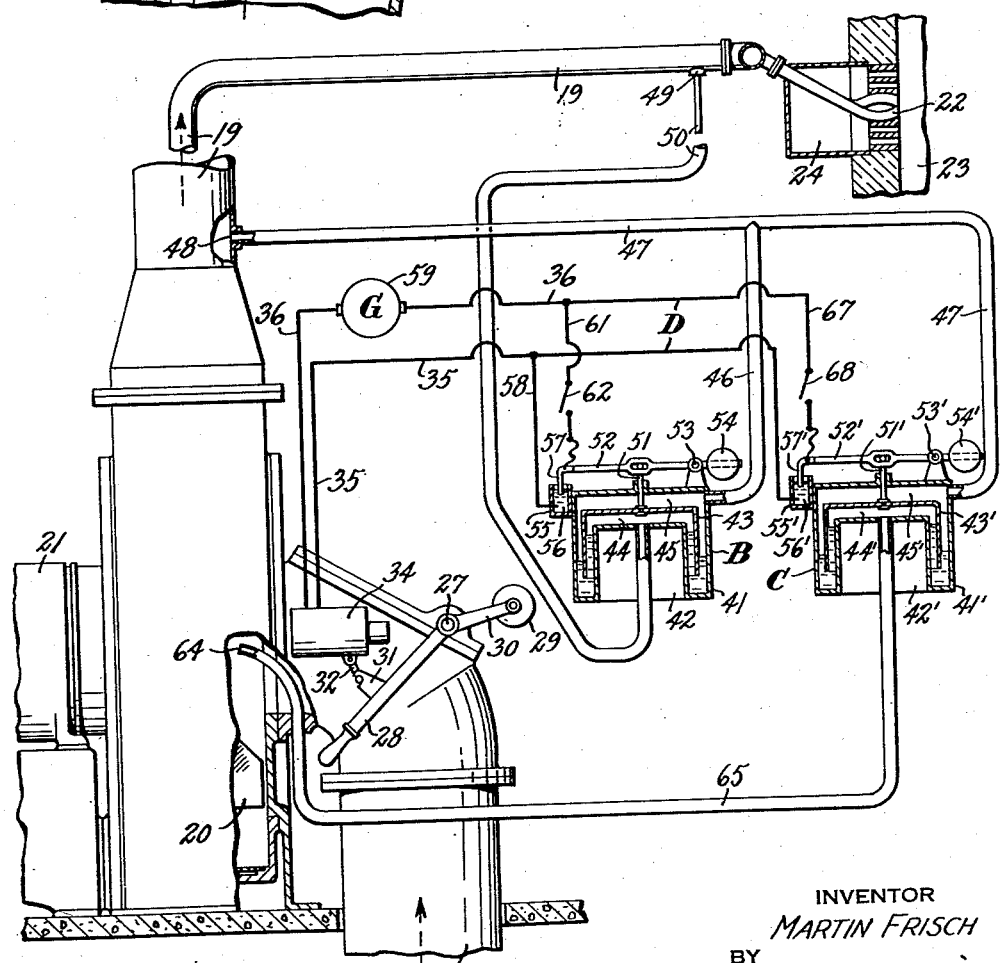
Fig. 3 is an elevational view, partly in section, similar to Fig. 1 but illustrating another form of the invention.

If desired, the control mechanism disclosed in Figs. 1 and 2 may be arranged so that the solenoid is normally energized while the pressure conditions in the system are satisfactory and will be deenergized when the pressure conditions or the differentials of pressures fall below the predetermined critical values desired. This may be accomplished by rearranging the switches comprising the liquids 56 and 56' and lever ends 57 and 57' to function in a manner opposite to that shown in Fig. 1, or by reversing the pressure connections to the pressure responsive devices B and C. As illustrated in Fig. 3, the pressure connections to the devices B and C are arranged so that a reduction in the pressure conditions or a reduction in the pressure differences between the points 48 and 49 will cause the bell float 43 to move upwardly and to break the circuit D when the lever end 57 is withdrawn from contact with the liquid 56. This will cause the solenoid 34 to be deenergized and will permit spring 39 to move lever 32 so as to release the arm 31 and permit damper 26 to be moved to its closed position and the conduit opened to a source of clear air. It will be understood, of course, that the solenoid and lever arm will be disposed relative to each other so that the deenergization of the solenoid will cause the damper lever to be released. As shown in Fig. 3, the position of the solenoid with respect to the damper lever has been reversed so that the damper is maintained in open position when the solenoid is energized. The same action will take place with respect to device C when the pressure condition at points 48 and 64 in conduit 19 or when the difference in pressure between these points falls below the predetermined critical values. To reset the control mechanism, the solenoid must be energized and the damper lever moved to open position of the damper so that lever 32 will engage arm 31. The solenoid will be energized when the operating conditions of the system return to normal and the circuit D is closed either through liquid 56 or 56' or both. It, of course, is possible to hold either lever 52 or 52' so that the end thereof is in contact with the liquid 56 or 56' to thereby close circuit D and permit the reenergization of the solenoid prior to the resumption of normal operating conditions in the system.

Figure 4:
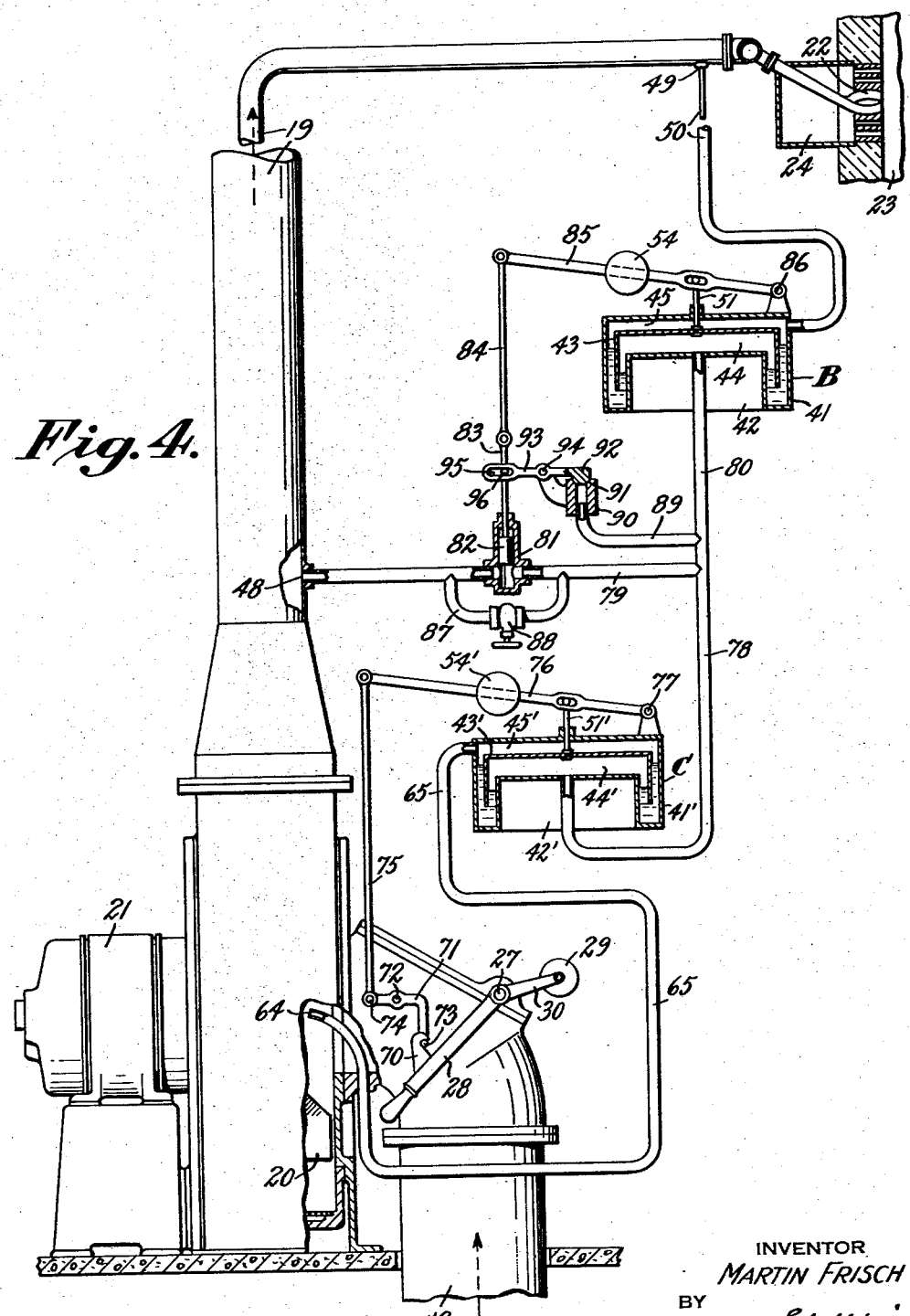
Figs. 4 and 5 are elevational views, partly in section, similar to Fig. 1 showing other forms of the invention.

In the form of the invention disclosed in Fig. 4, mechanical means without the use of electrical means are employed for controlling the damper cut off. As shown in Fig. 4, the pressure responsive devices B and C and their connections to the system, specifically to the feed conduit 19, are substantially the same as shown in Fig. 1. The damper lever 28 is provided with an arm 70 which is engaged when the damper is in open position by a lever 71 pivoted at 72 intermediate its ends. The end 73 of lever 71 engages the arm 70, and the end 74 is connected by a link 75 to one end of a lever 76, the other end of which is pivoted at 77 to the casing 41' of the pressure responsive device C. Chamber 44' of the device C is connected by a pipe 78 to a pipe 79 which communicates with the feed conduit 19 at the point 48. Pressure responsive device B has its pressure chamber 44 connected to the point 48 of feed conduit 19 by pipes 80 and 79. Pipe 79 is divided at a point intermediate its ends by a valve 81 of any suitable type, such as the piston valve shown. The piston 82 has its rod 83 connected by a link 84 to one end of lever 85 which is pivoted at its other end 86 to the casing 41 of the pressure responsive device B. A by-pass 87 controlled by a valve 88 is connected at its ends to the pipe 79 so as to by-pass valve 81. Pipe 80 has a branch pipe 89, the outer end of which is provided with a valve 90 of any suitable type. As shown, this valve comprises a seat 91 which is adapted to be closed by a member 92 on one end of a lever 93 pivoted at 94 between its ends, the other end of which lever is provided with a slot 95 in which is received a pin 96 mounted on the piston rod 83. The function of valve 90 is to open the system to the atmosphere to prevent locking of the system when valve 81 is closed.

The operation of the embodiment disclosed in Fig. 4 is as follows: When the pressure conditions in feed conduit 19 or the differences in pressures at the points 48 and 49 are varied so that they fall below the predetermined desired minimum, the pressure in chamber 45 of device B may be increased, or the pressure in chamber 44 will be decreased or both, so that lever 85 moves downwardly or in a counter-clockwise direction as seen in Fig. 4, thereby moving piston 82 of valve 81 downwardy and closing pipe 79. At the same time the downward movement of piston 82 rocks lever 93 about its pivot 94 in a counter-clockwise direction, as seen in Fig. 4, and raises member 92 from its seat 91 thereby opening chamber 44 of device B and chamber 44' of device C to the atmosphere. The reduction in pressure in chamber 44' of device C due to the opening of valve 90 will permit lever 76 to move downwardly or in a counter-clockwise direction, as seen in Fig. 4, and will move link 75 downwardly and rock lever 71 about its pivot 72 in a counter-clockwise direction and release the damper lever 28 which will then move the damper to closed position to cut off communication between the furnace and the mill and open the conduit to a source of clear air. In the event the means for driving the exhauster fan should stop, or if the fan blades are stripped, or if the exhauster becomes plugged up, the differential in pressure between the points 48 and 64 will cause bell float 43' to move downwardly, as seen in Fig. 4, and release the damper and cause it to move to closed position without the device B assisting in the operation. If the pressure conditions in the system have returned to normal so that the minimum desired critical pressure or differentials of pressure are exceeded, the damper may be opened by hand and will be retained in open position by the lever 71.

When normal operating conditions are resumed in the system, the control mechanism will automatically return to normal, so that all that is necessary is to move the damper to open position so lever 71 will engage arm 70 in the damper lever 28 to retain the damper in open position.

Figure 5:
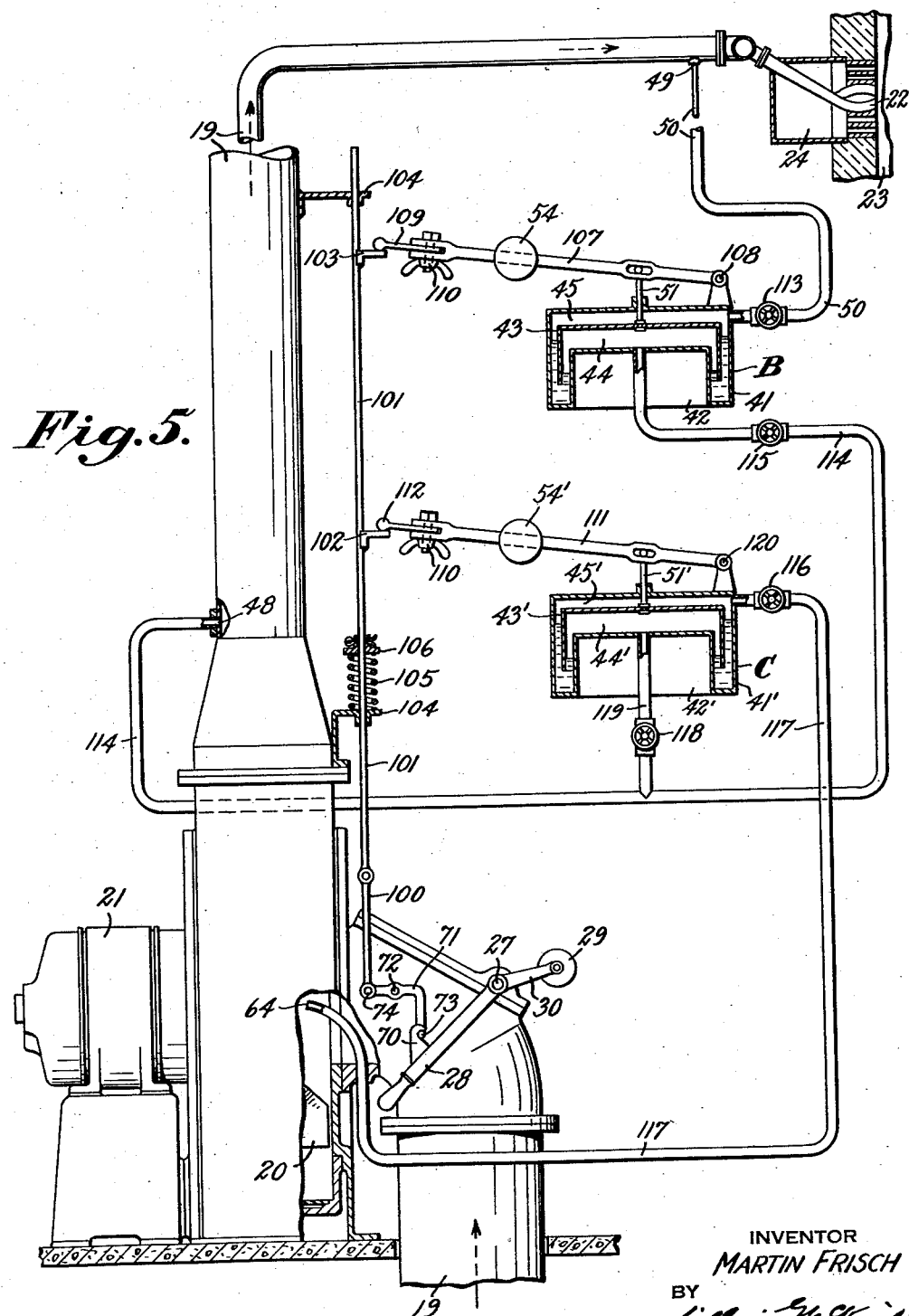

In the embodiment of the invention disclosed in Fig. 5, the controlling mechanism operates in response to the same pressure impulses and causes as described in connection with the other forms disclosed herein, but this form includes mechanism which permits each of the pressure responsive devices to act directly on the damper lever to release the same and cause it to close the feed conduit 19. As shown in Fig. 5, lever 71 is connected at its end 74 by a link 100 to a reciprocating rod 101 having spaced projections 102 and 103 thereon. Rod 101 is guided by suitable means such as the guide members 104 shown. A coil spring 105 disposed between the lower guide 104, as shown in Fig. 5, and a spring seat 106 secured at a suitable point to the rod 101, normally urges the rod 101 in an upward direction so that the lever 71 normally holds the damper in open position. Pressure responsive device B has its bell float 43 connected to a lever 107 pivoted at one end 108 to the casing 41 of the device B, and its other end provided with a finger 109 which is adjustable on the lever 107 so as to extend the desired distance from the end of the lever. Any suitable means such as the adjusting means indicated at 110, may be utilized for this purpose. The bell float 43' of device C is also connected to a similar lever 111 pivoted at one end 120 to casing 41' and which is provided with an adjustable finger 112. The fingers 109 and 112 are adjusted in position so that they normally rest on the projections 102 and 103, respectively. The pipe connecting the chamber 45 of device B with point 49 of feed conduit 19 is provided with a valve 113, and pipe 114 which connects chamber 44 of device B with point 48 of feed conduit 19 is provided with a valve 115. A valve 116 controls pipe 117 which connects chamber 45' of device C to point 64 in the feed conduit 19 and a valve 118 controls pipe 119 which connects chamber 44' of device C with pipe 114 and to the point 48 in feed conduit 19.

If during the operation of the system disclosed in Fig. 5 an accident occurs, such as the plugging up of the burner, or of the feed conduit 19, or of the mill, or in consequence of any other cause resulting in a reduction of the air and fuel flowing through the conduit 19 to a dangerous value or below a predetermined critical minimum, the bell float 43 of pressure responsive device B will move downwardly, as seen in Fig. 5, due either to an increase in pressure in chamber 45 or to a decrease in pressure in chamber 44 or both, and will cause lever 107 to move downwardly or in a counter-clockwise direction, as seen in Fig. 5, and to move rod 101 downwardly thereby rocking latch lever 71 about its pivot 72 in a counter-clockwise direction and releasing the damper and permitting it to move to closed position to cut off the mill from the furnace and open the conduit to a source of clear air. In the event of the occurrence of such accidents as the stalling or stopping of the means for driving the exhauster fan or the stripping of the blades from the fan or the plugging of the exhauster, device C will respond to the changes in pressure caused by any of such accidents and as a result the bell float 43' will be moved downwardly and will cause lever 111 to move downwardly thereby moving rod 101 downwardly to rock the lever 71 and release the damper to permit it to move to closed position. Obviously, the fingers 109 and 112 may be adjusted so as to entirely miss or clear the projections 102 or 103 to thereby eliminate the action of either or both of the pressure responsive devices from functioning in the control system.

When normal operating conditions in the system are resumed, spring 105 will return lever 71 to a position in which it will engage arm 70 of damper lever 28 when the damper has been moved to open position, or either or both of the levers 107 or 111 may be held in their upper positions, prior to the resumption of normal conditions, or the arms 109 or 112 may be adjusted to clear the projections 102 and 103, so that spring 105 will move lever 71 to the position where it will hold the damper open.

It will thus be seen that I have provided a control mechanism for cutting off communication between a furnace and a coal pulverizing mill and opening the conduit connecting the mill and furnace to a source of clear air, at such times as it becomes necessary to do so due to any cause which might result in flame propagation from the furnace to the mill and an explosion in the mill. Inasmuch as many variations in the forms or embodiments of the invention herein disclosed or the several parts thereof may be made without transcending the principles of the invention, it will be understood that no intention is entertained to limit the scope of the invention except by the breadth of the claims appended hereto.

What I claim is:

1. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit and normally retained in a position so that the conduit is open, and means responsive to the pressure existing in the conduit between the fan and the furnace for releasing the damper and permitting it to close the conduit when said pressure falls below a predetermined minimum.

2. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit and normally retained in a position so that the conduit is open, and means responsive to differences in pressure at spaced points in the conduit between the fan and the furnace for releasing the damper and permitting it to close the conduit when said pressure difference falls below a predetermined minimum.

3. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit and normally retained in a position so that the conduit is open, and means responsive to differences in pressure between a point in the conduit adjacent the furnace and a point in the conduit on the suction side of the fan for releasing the damper and permitting it to close the conduit when the pressure difference falls below a predetermined minimum.

4. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, electrically operated means for normally holding the damper in a position so that the conduit is open, and means responsive to the pressure in the conduit to cause the electrically operated means to be actuated to cause the damper to close the conduit when the pressure in the conduit falls below a predetermined minimum.

5. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, electrically operated means for normally holding the damper in a position so that the conduit is open, and means responsive to the difference in pressure at spaced points in the conduit to cause the electrically operated means to be actuated to cause the damper to close the conduit when the pressure in the conduit falls below a predetermined minimum.

6. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, a solenoid, a lever operated by the solenoid, means connected with the damper and engageable by the lever for holding the damper in position so that the conduit is open, and means responsive to the pressure in the conduit for causing the solenoid to operate the lever to release the damper and permit the damper to close the conduit when the pressure in the conduit falls below a predetermined minimum.

7. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, means for holding the damper in a position so that the conduit is open, and means responsive to the pressure in the conduit for operating other pressure responsive means to cause the means for holding the damper to release the damper and permit it to close the conduit when the pressure in the conduit falls below a predetermined minimum.

8. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, a lever for holding the damper in a position so that the conduit is open, a device responsive to pressure comprising a movable member, one side of the movable member being in communication with the conduit at a point adjacent the furnace, the other side being in communication with the conduit at a point adjacent the pressure side of the exhauster fan, a valve for shutting off communication of said other side of the movable member with the conduit, means connecting said valve with the movable member, means operated by said movable member to cause said other side thereof to communicate with the atmosphere, and a second pressure responsive device comprising a movable member operatively connected to the lever to move the lever to release the damper and cause it to close the conduit, one side of said last mentioned movable member being in communication with the conduit at a point adjacent the pressure side of the exhauster fan and with said other side of the first mentioned movable member, the other side of the second mentioned movable member being in communication with the conduit at a point adjacent the suction side of the fan.

9. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, a lever for holding the damper in a position so that the conduit is open and operable to permit the damper to move to closed position, a device responsive to pressure comprising a movable member, a tube connecting one side of the movable member with the conduit at a point adjacent the furnace, a second tube connecting the other side of the movable member with the conduit at a point adjacent the pressure side of the fan, a valve in the second tube operatively connected to the movable member, a second valve operatively connected to the movable member and adapted to open the second tube to the atmosphere, a second pressure responsive device having a movable member operatively connected to said lever to move the lever to release the damper and cause it to close the conduit, a third tube for connecting one side of the last mentioned movable member with the second tube and a fourth tube connecting the other side of the last mentioned movable member with the conduit at a point adjacent the suction side of the fan.

10. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, means for holding the damper in a position so that the conduit is open, a pressure responsive device connected to the conduit, reciprocating means for operating the means for holding the damper, and means connected to the pressure responsive device for operating the reciprocating means when the pressure in the conduit falls below a predetermined minimum to cause the damper to close the conduit.

11. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, a lever for holding the damper in a position so that the conduit is normally open, reciprocating means connected to the lever, a pressure responsive device in communication with the conduit at spaced points, and means connected with the pressure responsive device for operating the reciprocating means when the difference in pressure between the points in the conduit which are in communication with the pressure responsive device falls below a predetermined minimum to cause the damper to close the conduit.

12. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, a lever for holding the damper in a position so that the conduit is normally open, reciprocating means connected to the lever, a pressure responsive device having opposite sides in communication with the conduit at a point adjacent the furnace and at a point adjacent the pressure side of the fan, a second pressure responsive device having opposite sides in communication with the conduit at points adjacent the suction and pressure sides of the fan respectively, and means connected to each of the pressure responsive devices for operating the reciprocating means to cause the damper to close the conduit when the difference in pressure in the conduit between the points to which either of the pressure responsive devices is connected falls below a predetermined minimum.

13. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit, a lever for holding the damper so that the conduit is open, a solenoid for operating the lever, a pressure responsive device having opposite sides in communication with the conduit at a point adjacent the furnace and at a point adjacent the pressure side of the fan, a second pressure responsive device having opposite sides in communication with the conduit at the suction and pressure sides of the fan respectively, an electrical circuit connected with the solenoid and a switch connected to each pressure responsive device and included in the said circuit whereby when the difference in pressure in the conduit between the points in communication with either of the pressure responsive devices falls below a predetermined minimum, the pressure responsive device will actuate the switch to which it is connected to cause the solenoid to release the lever and permit the damper to close the conduit.

14. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit and normally detained in a position so that the conduit is open, means for connecting the conduit with a source of clear air, and means responsive to the pressure existing in the conduit for releasing the damper and permitting it to close the conduit and permit the introduction of clear air into the conduit when said pressure falls below a predetermined minimum.

15. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit and normally retained in a position so that the conduit is open, an opening in the conduit on the suction side of the fan through which clear air may be introduced into the conduit, said opening being closed when the damper is in a position such that the conduit is open, and means responsive to the pressure in the conduit for releasing the damper to close the conduit and open said opening to permit clear air to be introduced into the conduit when said pressure in the conduit falls below a predetermined minimum.

16. A fuel combustion system comprising a source of fuel of a character capable of being carried in a stream of air, a furnace in which the fuel is burned, a conduit connecting the source of fuel and the furnace and through which the fuel is conducted to the furnace, means for closing the conduit, and means responsive to pressure variations in the system to cause the operation of the means for closing the conduit to thereby prevent flame propagation from the furnace to the source of fuel.

17. A fuel combustion system comprising a source of fuel of a character capable of being carried in a stream of air, a furnace in which the fuel is burned, a conduit connecting the source of fuel and the furnace and through which the fuel is conducted to the furnace, a damper for closing the conduit and normally retained in a position such that the conduit is open, and means responsive to pressure variations in the system for permitting the operation of the damper to cause it to close the conduit to thereby prevent flame propagation from the furnace to the source of fuel.

18. A fuel combustion system comprising a source of fuel of a character capable of being carried in a stream of air, a furnace in which the fuel is burned, a conduit connecting the source of fuel and the furnace and through which the fuel is conducted to the furnace, means for closing the conduit, and means responsive to pressure variations in the conduit for causing the operation of the means for closing the conduit to thereby prevent flame propagation from the furnace to the source of fuel.

19. A fuel combustion system comprising a source of fuel of a character capable of being carried in a stream of air, a furnace in which the fuel is burned, a conduit connecting the source of fuel and the furnace and through which the fuel is conducted to the furnace, means for closing the conduit, and means responsive to the differences in pressure at different points in the system for causing the operation of the means for closing the conduit to thereby prevent flame propagation from the furnace to the source of fuel.

20. A fuel combustion system comprising a source of fuel of a character capable of being carried in a stream of air, a furnace in which the fuel is burned, a conduit connecting the source of fuel and the furnace and through which the fuel is conducted to the furnace, a damper for closing the conduit and normally retained in a position such that the conduit is open, and means responsive to differences in pressure at different points in the conduit for causing the operation of the damper to cause it to close the conduit to thereby prevent flame propagation from the furnace to the source of fuel.

21. In combination with a furnace for burning pulverized fuel, a pulverizing mill, means for supplying fuel and air to the mill, a conduit connecting the discharge of the mill with the furnace, an exhauster fan in the conduit for removing pulverized fuel and air from the mill and delivering it to the furnace through the conduit, a damper adapted to close the conduit and normally retained in a position so that the conduit is open, and means responsive to pressure variations in the conduit for permitting the operation of the damper and causing it to close the conduit when said pressure falls below a predetermined minimum.

22. A fuel combustion system comprising a source of fuel of a character capable of being carried in a stream of air, a furnace in which the fuel is burned, a conduit connecting the source of fuel and the furnace and through which the fuel is conducted to the furnace, means for closing the conduit, means for connecting the conduit with a source of clear air, and means responsive to pressure variations in the system for permitting the operation of the means for closing the conduit and for permitting the introduction of clear air into the conduit.

23. A fuel combustion system comprising a source of fuel of a character capable of being carried in a stream of air, a furnace in which the fuel is burned, a conduit connecting the source of fuel and the furnace and through which the fuel is conducted to the furnace, means for closing the conduit, means for connecting the conduit with a source of clear air, and means responsive to pressure variations in the conduit for permitting the operation of the means for closing the conduit and for permitting the introduction of clear air into the conduit.

24. The method of fuel combustion which comprises supplying to a furnace through a conducting zone, fuel in a stream of air from a source of such fuel, and closing the conducting zone in response to pressure conditions therein when such conditions are likely to cause flame propagation from the furnace to the source of fuel.

25. The method of fuel combustion which comprises supplying to a furnace through a conducting zone, fuel in a stream of air from a source of such fuel, and closing the conducting zone in response to the differential of pressures existing at spaced points in the conducting zone when said pressure differential is likely to cause flame propagation from the furnace to the source of fuel.

MARTIN FRISCH.